(12) United States Patent
Kita et al.

(10) Patent No.: US 6,324,829 B1
(45) Date of Patent: Dec. 4, 2001

(54) STEAM COOLED SYSTEM IN COMBINED CYCLE POWER PLANT

(75) Inventors: Yoshiyuki Kita; Tomoka Tanaka; Yasuhiro Hashimoto; Masayuki Takahama; Jun Yasuraoka; Hidetoshi Iida; Koichi Akagi; Hideki Haruta, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/237,845

(22) Filed: Jan. 27, 1999

(30) Foreign Application Priority Data

| Jan. 29, 1998 | (JP) | 10-016811 |
| Feb. 10, 1998 | (JP) | 10-028149 |
| Jul. 6, 1998 | (JP) | 10-190327 |

(51) Int. Cl.⁷ .................. F02C 6/00; F02C 9/00
(52) U.S. Cl. ...................... 60/39.182; 60/39.26
(58) Field of Search .............. 60/39.182, 39.26, 60/39.3, 39.55, 39.75

(56) References Cited

U.S. PATENT DOCUMENTS

| 4,571,935 | * | 2/1986 | Rice ........................ 60/39.182 X |
| 5,412,937 | * | 5/1995 | Tomlinson et al. ........ 60/39.182 X |
| 5,778,657 | * | 7/1998 | Ohtomo et al. ........... 60/39.182 |
| 6,038,851 | * | 3/2000 | Shiba ....................... 60/39.182 |
| 6,125,623 | * | 10/2000 | Cloyd et al. .............. 60/39.182 X |

FOREIGN PATENT DOCUMENTS

| 5-163960 | 6/1993 | (JP) |
| 10-110629 | 4/1998 | (JP) |
| 10-131721 | 5/1998 | (JP) |

* cited by examiner

Primary Examiner—Timothy S. Thorpe
Assistant Examiner—Michael K. Gray
(74) Attorney, Agent, or Firm—Wenderoth, Lind & Ponack, L.L.P.

(57) ABSTRACT

A gas turbine steam cooled system has a high temperature portion 8 outlet steam temperature maintained to a predetermined value without a cooling steam pressure becoming lower than the pressure in the gas turbine cylinder. Steam coming from an intermediate pressure superheater 10 of a waste heat recovery boiler 2 is led into the high temperature portion 8 of the gas turbine for cooling thereof. The temperature of the cooling steam at the outlet of the high temperature portion 8 is detected by a high temperature portion outlet steam temperature detector 15, and a signal thereof is sent a lower value selector 19 via a temperature controller 11. Pressure in the gas turbine cylinder is detected by a gas turbine cylinder pressure detector 17, and pressure of the cooling steam at the high temperature portion 8 outlet is detected by a high temperature portion outlet steam pressure detector 16. A differential signal thereof is sent to a pressure controller 18. Signals from the temperature controller 11 and the pressure controller 18 are inputted into the lower selector 19, and temperature control valve 12 is controlled by the lower value thereof to be opened and closed.

12 Claims, 5 Drawing Sheets

STEAM COOLED SYSTEM IN COMBINED CYCLE POWER PLANT

BACKGROUND OF THE INVENTION

1. Field of the Invention

The present invention relates generally to a steam cooled system in a combined cycle power plant, and more specifically to one constructed such that a high temperature portion (a portion to be cooled) of a gas turbine combustor in a combined cycle power plant, in which a gas turbine plant and a steam turbine plant are combined together, is cooled by steam coming from a waste heat recovery boiler.

2. Description of the Prior Art

In a combined cycle power plant in which a gas turbine plant and a steam turbine plant are combined together, a high temperature range of the thermal energy is taken charge of by a gas turbine and a low temperature range thereof by a steam turbine, respectively, so that the thermal energy is recovered and used effectively. Hence great attention has been recently paid to this power system.

In this combined cycle power plant, as one measure for enhancing the efficiency, in place of using air as a cooling medium for cooling the gas turbine high temperature portion, a system using steam generated in the bottoming cycle is being disclosed.

Figure 3:
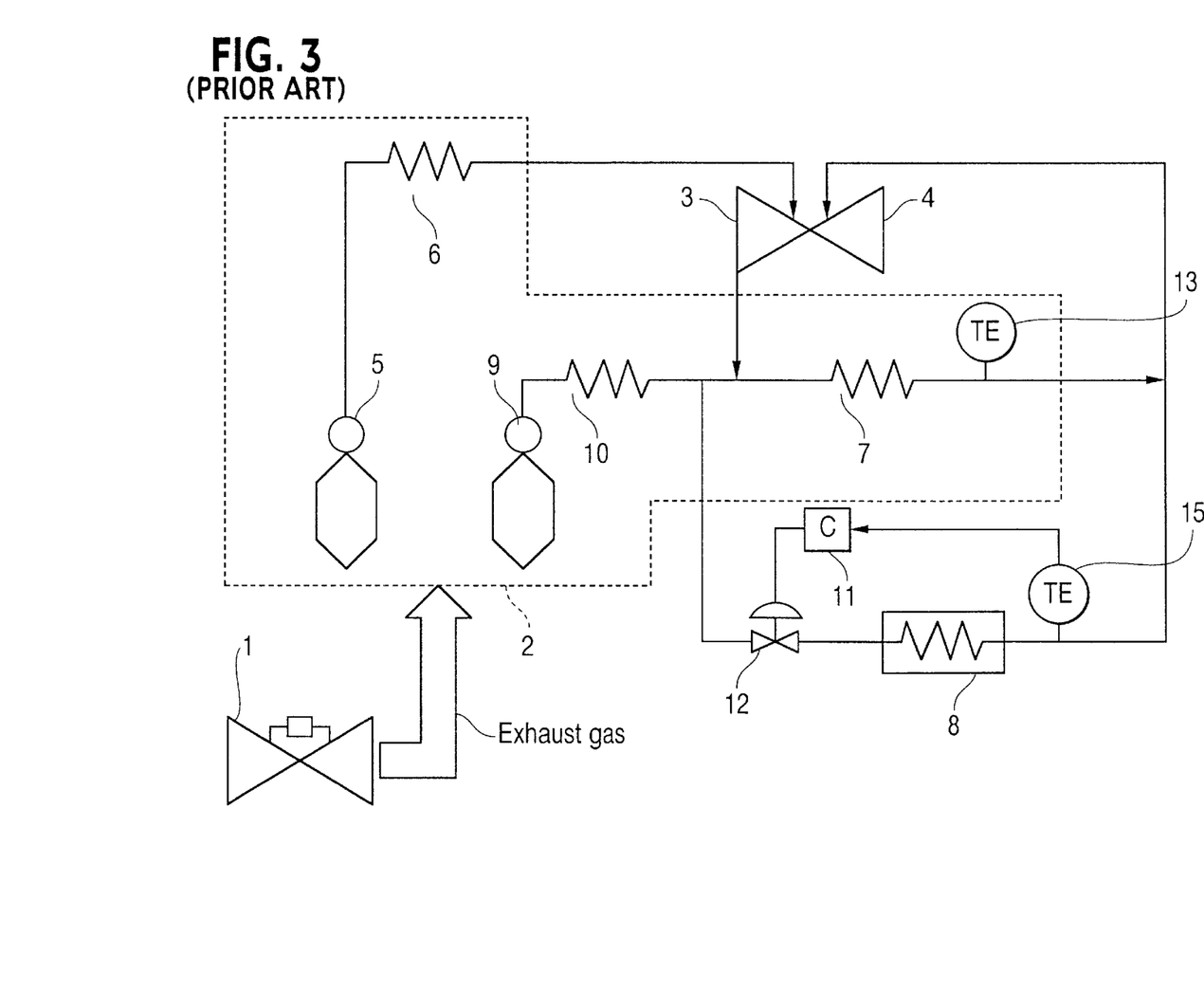
FIG. 3 is a diagrammatic view showing the construction of a prior art steam cooled system in a combined cycle power plant.

FIG. 3 shows a prior art gas turbine steam system in a combined cycle power plant. In FIG. 3, numeral 1 designates a gas turbine, numeral 2 designates a waste heat recovery boiler thereof, numeral 3 designates a high pressure steam turbine and numeral 4 designates an intermediate pressure steam turbine. The waste heat recovery boiler 2 comprises a high pressure drum 5, a high pressure superheater 6, a reheater 7, an intermediate pressure drum 9, an intermediate pressure superheater 10, etc.

Numeral 8 designates a high temperature portion (or a heat exchanger therefor) of a gas turbine combustor etc., which is a portion to be cooled by steam.

Numeral 12 designates a temperature control valve, which is controlled by a temperature control device 11. Numeral 13 designates a superheater outlet steam temperature detector and numeral 15 designates a high temperature portion outlet steam temperature detector.

In the gas turbine steam system shown in FIG. 3, exhaust gas of the gas turbine 1 is led into the waste heat recovery boiler 2. Steam from the high pressure drum 5 of the waste heat recovery boiler 2 is led into the high pressure steam turbine 3 via the high pressure superheater 6. Also, steam from the intermediate pressure drum 9 is led into the intermediate pressure steam turbine 4 via the intermediate pressure superheater 10 and the reheater 7 sequentially. Outlet steam of the high pressure steam turbine 3 joins in an inlet steam of the reheater 7.

On the other hand, outlet steam of the intermediate pressure superheater 10 diverges partly from that led to the reheater 7 to sequentially flow through the temperature control valve 12 and the high temperature portion 8 of the gas turbine combustor and then joins the outlet steam of the reheater 7 to be led into the intermediate pressure steam turbine 4.

Output of the high temperature portion outlet steam temperature detector 15, which is provided at an outlet of the high temperature portion 8, is sent to the temperature control valve 12, which is provided in a steam line on an inlet side of the high temperature portion 8 via the temperature control device 11.

Thus, the exhaust gas of the gas turbine 1 enters the waste heat recovery boiler 2 to generate a high pressure steam, an intermediate pressure steam and a low pressure steam. The steam generated at the high pressure drum 5 becomes superheated steam at the high pressure superheater 6 to work at the high pressure steam turbine 3 and then flows through a high pressure exhaust steam line to join in the intermediate pressure steam and then is reheated at the reheater 7 to be led into the intermediate pressure steam turbine 4. Steam generated at the intermediate pressure drum 9 is superheated at the intermediate pressure superheater 10 and is led in a necessary amount to the high temperature portion 8 of the gas turbine 1 combustor etc. for cooling thereof, either through a heat exchanger or directly in the high temperature portion 8, and then joins in the outlet steam of the reheater 7. Surplus steam joins in the steam coming from the high pressure steam turbine 3 through the high pressure exhaust steam line to be led to the reheater 7.

As to the steam which has passed through the high temperature portion 8, the temperature thereof is controlled such that the temperature control valve 12, which is provided in the steam line on the inlet side of the high temperature portion 8, is controlled by a control signal from the high temperature portion outlet steam temperature detector 15 and the temperature control device 11 so that the flow rate of the steam is controlled.

The prior art steam cooled system is a system in which the steam used for cooling of the high temperature portion 8 of the gas turbine combustor etc. is controlled in flow rate by the temperature control valve 12 provided at an inlet of the high temperature portion 8 so that the outlet steam temperature of the high temperature portion 8 is set to a predetermined value.

In this case, if a cooling steam pressure becomes lower than the pressure in a turbine cylinder of the gas turbine 1 (discharge pressure of gas turbine air compressor), combustion gas comes into the steam system and there arises a fear of the occurrence of problems, such as burning of the steam system etc.

That is, in the prior art system in which the temperature control valve 12 is provided at the inlet of the high temperature portion 8, while it is possible to control to suppress the rise of the outlet steam temperature of the high temperature portion 8, there is a problem in that it is difficult to control in the case where the cooling steam pressure becomes lower than the pressure in the turbine cylinder (the discharge pressure of gas turbine air compressor).

Also, in the prior art steam cooled system in the combined cycle power plant, while a basic framework of the control of the gas turbine operation is maintained such that the gas turbine is operated safely by a fuel flow control valve being controlled by a valve opening command signal, which is made by the lowest value of the fuel flow rate command signals given from a speed governing device (output control device), a combustion temperature control device, a load limit control device and an acceleration control device, there is no sufficient signal of flow rate control of the cooling steam for cooling the high temperature portion of the gas turbine.

That is, in the gas turbine employing the steam cooled system, as there is a need to prevent unusual excess cooling or heating and to suppress the occurrence of thermal stress at the gas turbine high temperature portion, it is necessary to control the steam supply rate so as to effect an appropriate cooling corresponding to the thermal load at the gas turbine high temperature portion.

SUMMARY OF THE INVENTION

In order to solve the problem in the relation of the cooling steam pressure and the pressure in the turbine cylinder in the prior art gas turbine steam cooled system in which the gas turbine high temperature portion is cooled by steam from the waste heat recovery boiler, it is a first object of the present invention to provide a gas turbine steam cooled system which is constructed such that there is no case of the cooling steam pressure becoming lower than the pressure in the gas turbine cylinder and the temperature rise of the high temperature portion outlet steam is suppressed as much as possible.

Based on the inventors' experience and knowledge as heretofore obtained that the fuel flow rate, being very sensitively influenced by changes in the thermal load, may be employed as a control factor, it is a second object of the present invention to provide a steam cooled system in the combined cycle power plant which is constructed such that supply of the cooling steam into the gas turbine high temperature portion is controlled appropriately corresponding to the thermal load at the gas turbine high temperature portion.

Further, it is a third object of the present invention to provide a monitoring system in the combined cycle power plant employing the steam cooled system of the high temperature portion, such as a combustor, which is constructed such that the outlet steam temperature of the high temperature portion is detected to earlier detect disorder in the high temperature portion so that the gas turbine may be operated safely.

In order to attain the first object, the present invention provides a steam cooled system in a combined cycle power plant constructed such that there is provided a temperature control valve at a cooling steam outlet of a high temperature portion of gas turbine, the temperature control valve performs a cooling steam temperature control so that the temperature of the cooling steam coming out of the high temperature portion is set to a predetermined value as well as performs a cooling steam pressure control, which is preferential to the cooling steam temperature control, so that the pressure of the cooling steam coming out of the high temperature portion may not become lower than the pressure in a turbine cylinder of the gas turbine.

In the steam cooled system according to the present invention, if the cooling steam pressure becomes lower than the pressure in the gas turbine cylinder (the discharge pressure of the gas turbine air compressor), even if the outlet steam temperature of the high temperature portion is higher than the predetermined value, the cooling steam pressure control is preferential to the cooling steam temperature control. There occurs no case in which the temperature control valve provided at the cooling steam outlet of the high temperature portion opens beyond the opening at that time, hence the cooling steam pressure does not lower further and is maintained higher than the pressure in the gas turbine cylinder (the discharge pressure of the gas turbine air compressor).

The steam cooled system according to the present invention may be constructed such that there are provided a cooling steam temperature control system for controlling the temperature control valve so that a cooling steam temperature at the cooling steam outlet is set to a predetermined value and a cooling steam pressure control system for controlling the temperature control valve so that a cooling steam pressure at the cooling steam outlet may not become lower than pressure in a turbine cylinder of the gas turbine. The temperature control valve is operated by a lower value out of the control signals of the temperature control system and the pressure control system.

In the gas turbine steam cooled system constructed as above, if the cooling steam pressure becomes lower than the pressure in the gas turbine cylinder (the discharge pressure of the gas turbine air compressor), because the temperature control valve provided at the cooling steam outlet of the high temperature portion is controlled by the lower value out of the two control signals, there occurs no case in which the temperature control valve opens beyond the opening at that time even if the outlet steam temperature of the high temperature portion is higher than the predetermined value, and the cooling steam pressure does not lower further.

Thus, the cooling steam pressure is maintained higher than the pressure in the gas turbine cylinder (the discharge pressure of the gas turbine air compressor) and the high temperature portion can be cooled with the cooling steam pressure not becoming lower than the pressure in the gas turbine cylinder.

Further, in order to attain the second object, the present invention provides a steam cooled system in a combined cycle power plant constructed such that there is provided a control device for controlling a flow rate of cooling steam supplied into the steam cooled system, based on an outlet steam temperature of the steam cooled system and a fuel supply rate to the gas turbine.

That is, in view of the fact that the thermal load of the gas turbine high temperature portion to be cooled changes corresponding to the fuel supply rate to the gas turbine, and yet the speed of such change is quick with a sensitive response, the fuel supply rate of the fuel supplied into the gas turbine is made one control factor. In addition thereto, the outlet steam temperature of the steam cooled system is made another control factor. Thus the steam flow rate of the cooling steam supplied into the steam cooled system is appropriately controlled.

In the combined cycle power plant employing the steam cooled system, it is preferable that the occurrence of a disorder, such as cracks, clogging of the steam system or the like, in the gas turbine high temperature portion is detected earlier by use of a temperature detecting signal of a high temperature portion outlet steam temperature detector so that safe operation of the gas turbine may be effected.

Thus, the present invention provides an outlet steam monitoring system in a steam cooled type gas turbine. The steam cooled type gas turbine is constructed such that a cooling steam is supplied into a high temperature portion of a combustor, blade or the like. The cooling steam, after being used for cooling, is recovered. A temperature detector detects an outlet temperature of the steam after being used for cooling. A control device, being inputted with a detected signal of the temperature detector for comparison with a predetermined temperature value, puts out a warning signal as well as a signal for throttling the opening of a fuel flow control valve to a predetermined opening or a signal for closing a shut-off valve, if a detected temperature of the temperature detector exceeds the predetermined temperature value.

In the outlet steam monitoring system of the present invention, the outlet steam temperature of the steam which has cooled the high temperature portion is detected by the temperature detector, and this detected signal is inputted into the control device. In the control device, the outlet steam temperature at the normal state, the temperature at the dangerous state, the upper limit temperature to shut off the fuel, etc. are set in advance, and the detected temperature is compared therewith. If the detected temperature exceeds the set temperature, the warning signal, the signal for throttling the opening of the flow control valve and the signal for closing the shut-off valve are put out corresponding to the respective level of the temperature rise. Thereby, disorder in the high temperature portion is detected earlier and a dangerous state can be avoided by the signals of the control device.

BRIEF DESCRIPTION OF THE DRAWINGS

FIGS. 2(a)–2(b) are views of a cooling steam supply system and control system of gas turbine high temperature portion in a steam cooled system of embodiment 2 according to the present invention, wherein

FIGS. 5(a) and 5(b) are graphs showing the relationship between temperature states and control signals in the outlet steam monitoring system of the embodiment 3, wherein FIG. 5(a) shows the temperature states and FIG. 5(b) shows the control signals.

DESCRIPTION OF THE PREFERRED EMBODIMENTS

Herebelow, a steam cooled system of the combined cycle power plant according to the present invention will be described concretely based on embodiments 1 and 2 shown in FIGS. 1 and 2. It is to be noted that, in the embodiments below, the same parts or components as those in the prior art shown in FIG. 3 are given the same reference numerals for ease of description.

Embodiment 1

Firstly, embodiment 1 shown in FIG. 1 will be described. In FIG. 1, a temperature control valve 12 is provided on a cooling steam outlet side of a high temperature portion 8, such as a combustor etc. Numeral 16 designates a high temperature portion outlet steam pressure detector and numeral 17 designates a gas turbine cylinder pressure detector. Construction thereof is made such that signals from these pressure detectors 16, 17 are given to a subtractor 20.

Numeral 18 designates a pressure controller, which receives an output signal from the subtractor 20. Numeral 19 designates a lower value selector, which receives signals from a temperature controller 11 and the pressure controller 18 to select a lower value thereof. Other portions of the construction thereof are substantially same as those of the gas turbine steam cooled system shown in FIG. 3 and description thereof will be omitted.

Figure 1:
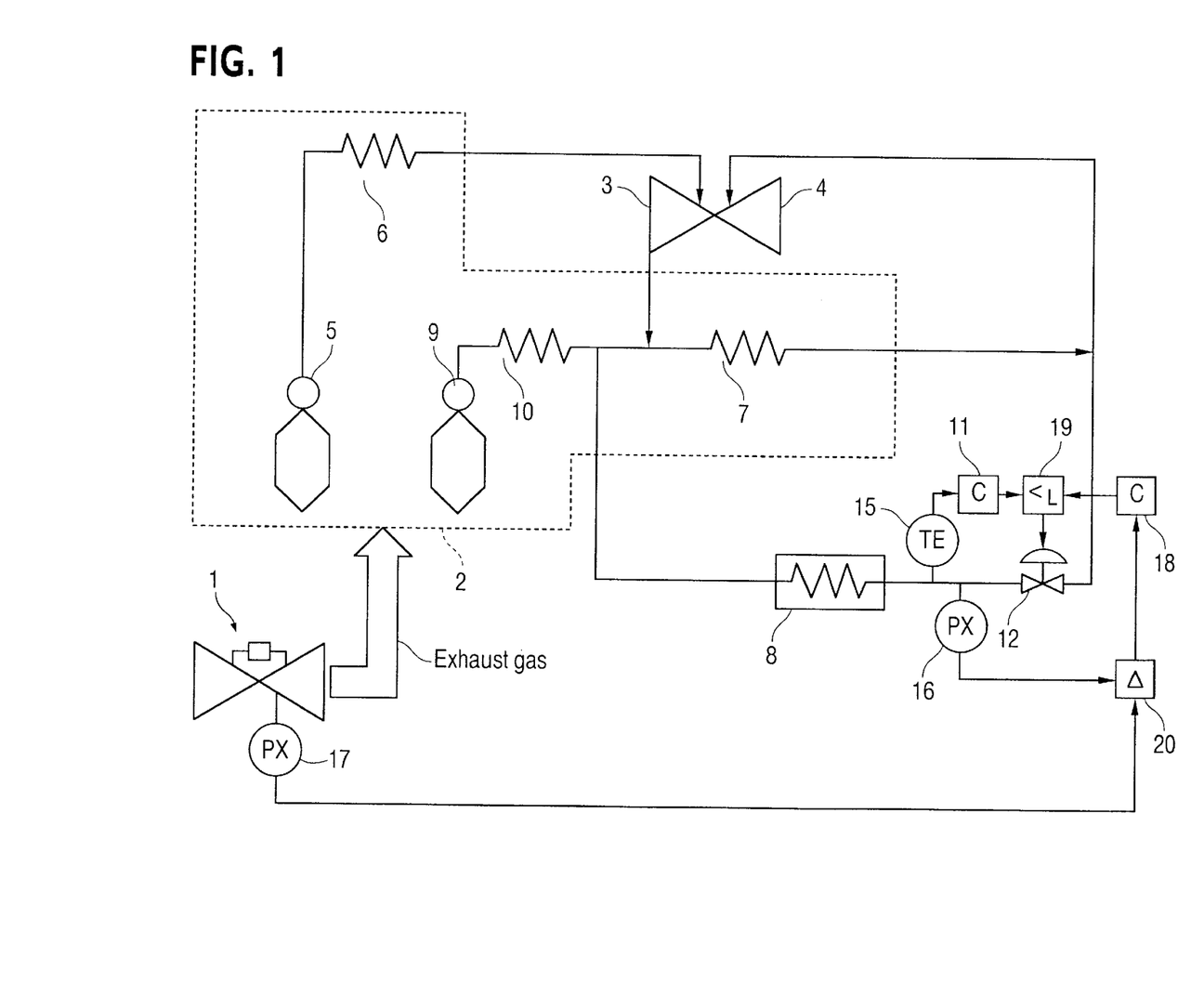
FIG. 1 is a diagrammatic view showing the construction of a steam cooled system in a combined cycle power plant of embodiment 1 according to the present invention.

In the gas turbine steam cooled system of FIG. 1 constructed as mentioned above, a signal showing a cooling steam temperature detected at a high temperature portion outlet steam temperature detector 15 is sent to the temperature controller 11. The temperature control valve 12 is adjusted so as to set a high temperature portion outlet steam temperature to a predetermined set value.

That is, the temperature controller 11 generates a signal such that, if the cooling steam temperature at an outlet of the high temperature portion 8 is higher than the set value, the temperature control valve 12 is operated in the direction to open to increase the flow rate of the cooling steam. If the cooling steam temperature at the outlet of the high temperature portion 8 is lower than the set value, the temperature control valve 12 is operated in the direction to close to decrease the flow rate of the cooling steam.

On the other hand, a cooling steam pressure at the outlet of the high temperature portion 8 is detected by the pressure detector 16 and the pressure in a gas turbine cylinder (the discharge pressure of a gas turbine air compressor) is detected by the pressure detector 17. Respective signals showing such measured pressures are inputted into the subtractor 20 to be subtracted therein. If there is recognized a tendency that the cooling steam pressure becomes lower than the pressure in the turbine cylinder, the pressure controller 18 generates a signal such that the temperature control valve 12 is operated in the direction to close.

The respective signals sent from the temperature controller 11 and the pressure controller 18 are inputted into the lower value selector 19 to be compared in size. The lower value is selected to be out put as a signal to operate the temperature control valve 12. By use of the lower value selector 19 selecting the signals of the temperature controller 11 and the pressure controller 18, the temperature controller 11 can exercise control such that a rise of the cooling steam temperature at the outlet of the high temperature portion 8 is suppressed as much as possible within the range of the outlet steam pressure of the high temperature portion 8 not becoming lower than the pressure in the gas turbine cylinder.

Embodiment 2

Next, embodiment 2 shown in FIGS. 2(a) and 2(b) will be described. In FIGS. 2(a) and 2(b), only a construction around the gas turbine high temperature portion to be cooled by steam is shown. As other portions of the construction of the combined cycle power plant are substantially the same as those shown in FIG. 1, description thereof will be omitted.

Figure 2A:
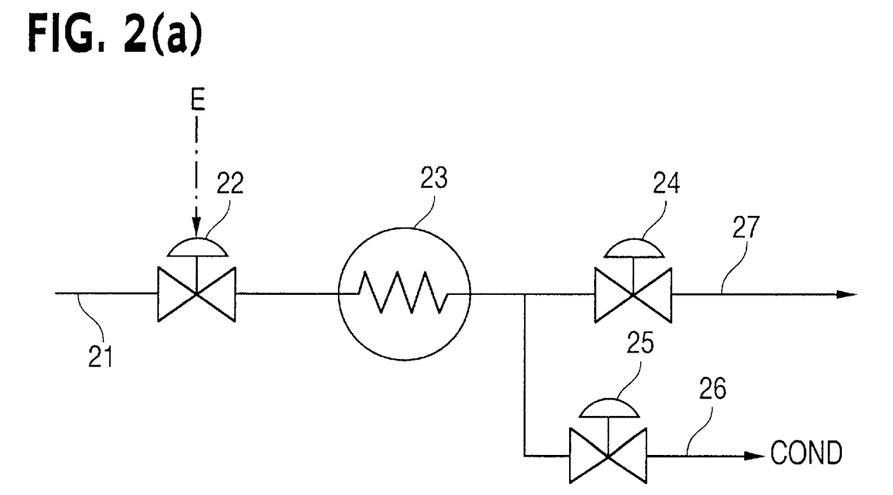
FIG. 2(a) is a schematic view of an arrangement of main components of the cooling steam supply system and FIG. 2(b) is a schematic view of a control circuit.

FIG. 2(a) shows a portional equipment arrangement in a main part of a cooling steam flow. Numeral 21 designates a cooling steam supply passage, which supplies therethrough a high pressure turbine exhaust steam or a generated steam of a waste heat recovery boiler etc. (not shown) as a cooling steam.

Numeral 22 designates a temperature control valve provided in the cooling steam supply passage 21, which is controlled to be opened and closed by an opening and closing command E obtained in a control circuit as described later. Numeral 23 designates a combustor disposed subsequently to the temperature control valve 22. Numeral 24 designates a pressure control valve provided in a cooling steam recovery passage 27 and numeral 25 designates a pressure control valve provided in a condenser connection passage 26 which connects to a condenser (not shown).

Figure 2B:
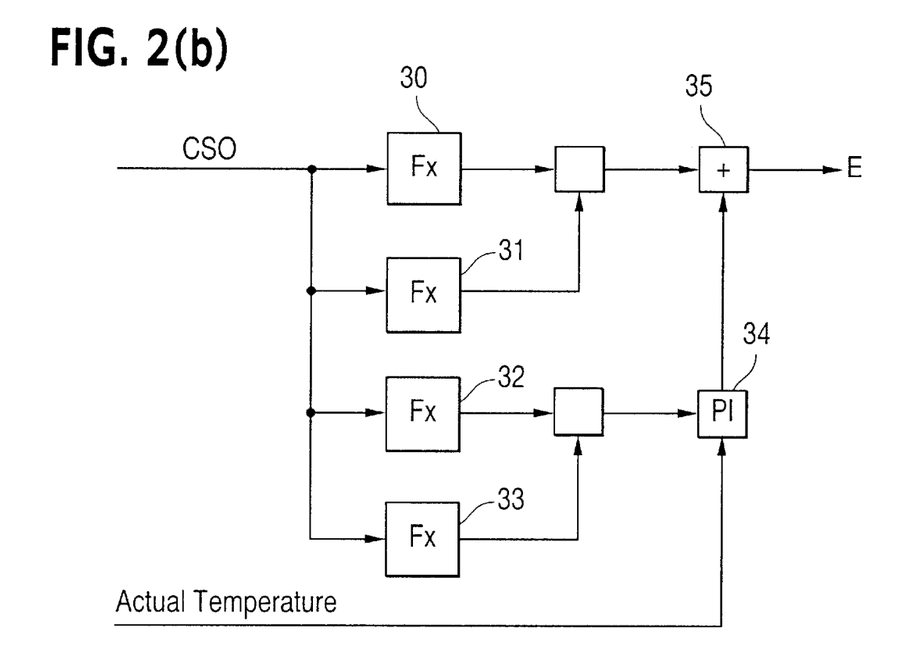

FIG. 2(b) shows a control circuit for generating the opening and closing command E, wherein an input command, on the one hand is a fuel control signal CSO (Control signal output) for controlling flow rate of fuel supplied into the combustor 23. This fuel control signal CSO is first computed by function units 30, 31, 32 and 33, respectively.

Also, an input command, on the other hand, is an outlet steam temperature (actual temperature) of the combustor 23.

Computation is made at a computing unit 34 which performs a proportional integration together with signals based on outputs of the function units 32, 33. The result is added at an adder 35 to signals based on outputs of the function units 30, 31 so that the opening and closing command E is generated.

It is to be noted that the fuel control signal CSO is corrected corresponding to a temperature of air charged for combustion. An opening command value and a temperature set value of the temperature control valve 22 are decided based thereon so that a sudden change in the fuel control signal CSO may be followed up well.

Also, the opening command value and the temperature set value, respectively, may be changed instantly by a fuel change-over command so that a change of the fuel maybe followed up quickly.

Also, the temperature set value is computed in comparison with the actual temperature by a proportional integration computation (PI control) or by a proportional computation (P control). The result is added to the opening command value, wherein there is set an upper limit in a direction of throttling. If the opening command is in saturation (100% or more), output of the proportional integration computation (PI) or the like is fixed to that value.

According to the present embodiment mentioned above, the cooling steam flow rate is controlled advance-wise based on a certain function setting corresponding to the fuel supply rate into the gas turbine. Thus, while in the method, for example, where the cooling steam flow rate is controlled relying only on the temperature of the cooling steam which has been used for cooling of the high temperature portion, there is a fear of delay due to the thermal capacity of pipings, etc. downstream of the high temperature portion, there is no such fear in the present embodiment. Unusual excess cooling or heating can be prevented and favorable cooling by steam, which suppresses occurrence of thermal stresses at the high temperature portion to be cooled, can be realized.

Embodiment 3

Embodiment 3 is an example of where a monitoring system constructed for monitoring an outlet steam temperature of a steam cooled type gas turbine. It uses a temperature detecting signal of a combustor high temperature portion outlet steam temperature detector, and will be described with reference to FIGS. 4 and 5.

Figure 4:
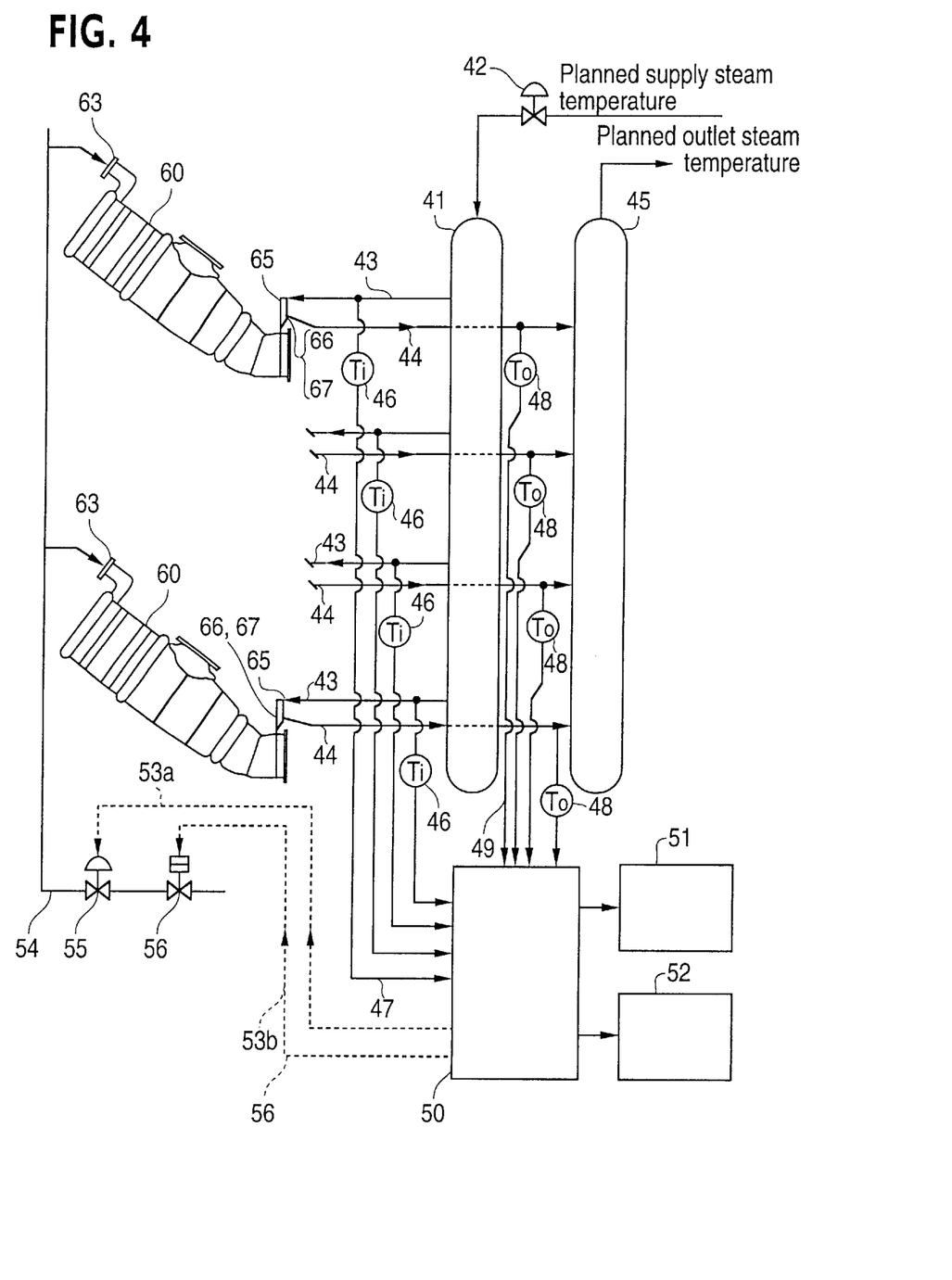
FIG. 4 is a constructional view of an outlet steam monitoring system in a steam cooled type gas turbine of embodiment 3 according to the present invention.
Figure 5A:
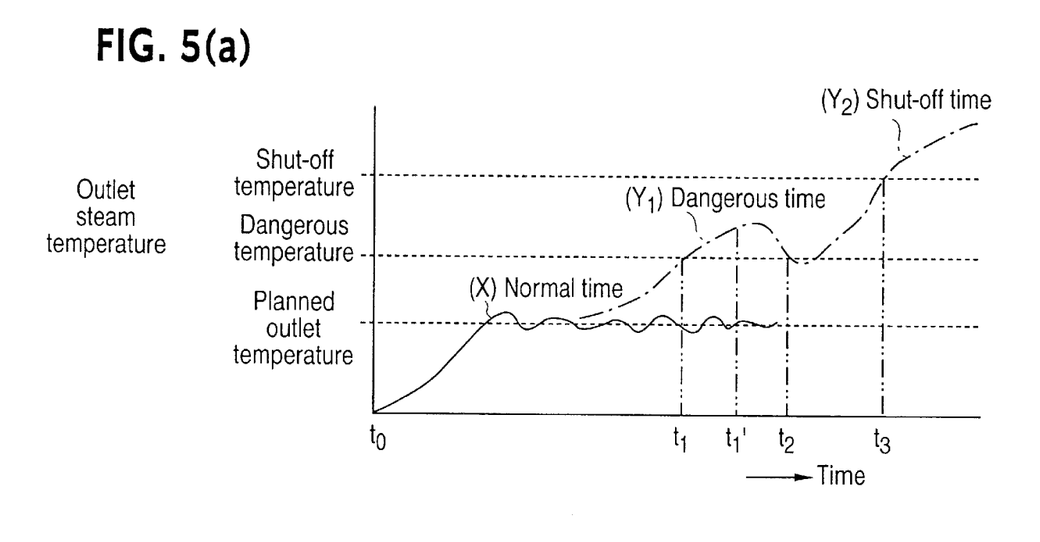
Figure 5B:
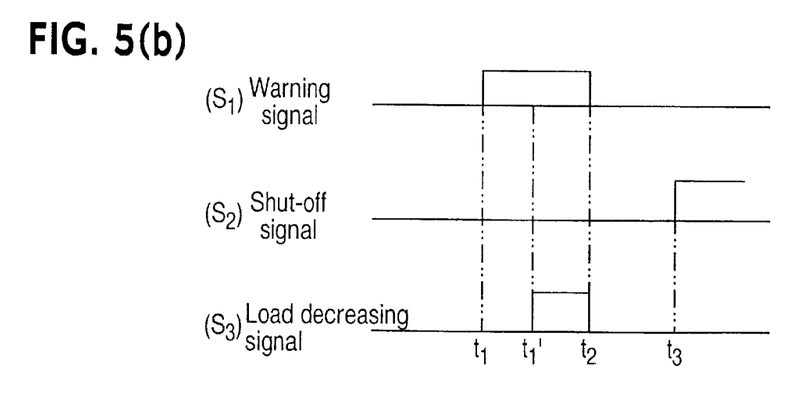

In FIG. 4, numeral 41 designates a steam supply manifold and numeral 42 designates a flow control valve, which controls flow rate of steam to be supplied. Numeral 43 designates a supply line, which supplies therethrough a cooling steam into a cooling steam supply pipe 65 of each of a plurality of combustor main bodies 60 from the steam supply manifold 41. Numeral 44 designates a recovery line and numeral 45 designates a steam recovery manifold. Steam recovered through the recovery line 44 from cooling steam recovery pipes 66, 67 of each of the plurality of combustor main bodies 60 is recovered into the steam recovery manifold 45.

Numeral 46 designates a temperature detector, which detects temperature of inlet steam flowing through the supply line 43 connecting to each of the plurality of combustor main bodies 60 to send a signal thereof to a control device 50 via an inlet steam temperature detecting line 47.

Numeral 48 also designates a temperature detector, which detects temperature of the steam recovered flowing through the recovery line 44 from the cooling steam recovery pipes 66, 67 to send a signal thereof to the control device 50 via an outlet steam temperature detecting line 49.

Numeral 50 designates the control device mentioned above, numeral 51 designates a display for displaying the result of computation at the control device 50 and numeral 52 designates a warning device for giving a warning by an alarm etc. when something wrong is found as the result of computation at the control device 50. Numeral 53 designates a control signal line, wherein a line 53$a$ thereof transmits therethrough a signal to control opening of a flow control valve 55 of a fuel system 54 and a line 53$b$ thereof transmits therethrough a signal to control opening and closing of a shut-off valve 56.

In the construction mentioned above, an inlet steam temperature detected by the temperature detector 46 of each of the combustors as the high temperature portions and an outlet steam temperature detected by the temperature detector 48 of the steam recovered from the cooling steam recovery pipes 66, 67 of each of the combustors are inputted into the control device 50.

The temperature of the steam supplied is approximately a planned supply steam temperature and the temperature of the steam recovered is approximately a planned outlet steam temperature during normal operation. The control device 50 confirms whether the inlet steam temperature is normal, as being approximately the planned supply steam temperature or not, and then monitors the outlet steam temperature. While the outlet steam temperature is approximately the planned outlet steam temperature during normal operation, if there occurs an unusual case, such as clogging of a steam passage or the occurrence of cracks or the like in the combustor main body, the temperature rises to a dangerous level or more to cause a dangerous situation. Hence the control is done such that the temperature situation is displayed on the display 51 and a signal is sent to the warning device 52 so as to generate a warning.

If the rising temperature situation continues, the control device 50 sends a control signal through the control signal line 53$b$ to throttle opening of the flow control valve 55 so that the fuel in the fuel system is decreased to control the load. If the temperature rises further to become higher than an upper limit temperature, for example a shut-off temperature, a control signal is put out through the control signal line 53$a$ to control the shut-off valve 56 to be closed and the gas turbine is tripped.

FIG. 5 is an explanatory view of the situation mentioned above, wherein FIG. 5($a$) shows changes in the outlet steam temperature and FIG. 5($b$) shows control signals corresponding to the temperature. In FIG. 5($a$), the outlet steam temperature is in the state of approximately the planned outlet steam temperature at the normal operation time as shown by (X). If the temperature rises beyond the dangerous temperature at time ti as shown by ($Y_1$), the control device 50 recognizes a dangerous situation of the combustor main body 60 and puts out a warning signal ($S_1$) as shown in FIG. 5($b$) continuously during the time $t_1$ to $t_2$ exceeding the dangerous temperature and the warning device 51 is operated.

If the temperature continues to rise for a certain time until time $t_1'$ between the time $t_1$ to $t_2$, the control device puts out a load decreasing signal ($S_3$) as shown in FIG. 5($b$) to control opening of the flow control valve 55 of the fuel system 54 to be throttled. If the temperature rises further to exceed the shut-off temperature at time $t_1$ as shown by (YZ), a shut-off signal ($S_2$) as shown in FIG. 5($b$) is put out to close the shut-off valve 56 of the fuel system 54 so that fuel supply to a main fuel supply pipe 63 is stopped and the gas turbine is tripped.

It is to be noted that although the illustration of FIG. 4 is made in a form of omission on the example where the plurality of the combustor main bodies 60 are arranged in the common fuel system 54 to control the flow control valve 55 and the shut-off valve 56 commonly, needless to mention, it is necessary to control the flow control valve and the shut-off valve of the respective fuel systems independently with respect to each of the combustor main bodies 60, wherein if an accident or disorder of each of the combustors is detected, the flow rate of only the combustor on which disorder has been detected can be controlled and the shut-off valve thereof closed.

Also, in the present embodiment, although the example of the steam cooled combustor has been described, the invention is not limited thereto, but may be applied to temperature monitoring of an object to be cooled which can not only be a combustor, but also a stationary blade and a moving blade, with the same function and effect.

According to the present embodiment, the temperature of the outlet steam recovered through the recovery line 44 from the cooling steam recovery pipes 66, 67 of the combustor main body 60 is detected by the temperature detector 48 to be inputted into the control device 50 so that the temperature rise is monitored by the control device 50. If the outlet steam temperature exceeds the predetermined temperature, the warning device 52 is operated to generate a warning. The flow control valve 55 is controlled to control the fuel flow rate or to close the shut-off valve 56 to stop the fuel supply. Disorder of the combustor can thereby be detected earlier by the change in the outlet steam temperature and a safe operation of the gas turbine can be ensured.

As described above with respect to the embodiments 1 and 2, in the steam cooled system of the combined cycle power plant according to the present invention, the construction is made such that there is provided the temperature control valve at the cooling steam outlet of the high temperature portion of the gas turbine. This temperature control valve performs cooling steam temperature control so that the temperature of the cooling steam coming out of the high temperature portion is set to the predetermined value, and also performs cooling steam pressure control, which is preferential to the cooling steam temperature control, so that the pressure of the cooling steam coming out of the high pressure portion may not become lower than the pressure in the gas turbine cylinder.

According to this gas turbine steam cooled system,it is possible to effect cooling by steam so that the temperature of the cooling steam coming out of the gas turbine high temperature portion may not become higher than the predetermined temperature within the range of the cooling steam pressure not becoming lower than the pressure in the gas turbine cylinder.

Also, according to the present invention there are provided the cooling steam temperature control system for controlling the temperature control valve. The cooling steam temperature at the cooling steam outlet of the gas turbine high temperature portion is set to the predetermined set values. The cooling steam pressure control system controls the temperature control valve so that the cooling steam pressure at the cooling steam outlet may not become lower than the pressure in the gas turbine cylinder. The temperature control valve is operated by the lower value out of the signals of these two control systems. Accordingly, a device in which the cooling steam pressure is safely maintained higher than the pressure in the gas turbine cylinder in preference to the control of the cooling steam temperature at the outlet of the gas turbine high temperature portion having a simple construction can be realized.

Also, according to the present invention in another construction, based on the experience and knowledge of the inventors in that the thermal load of the gas turbine high temperature portion to be cooled changes corresponding to the fuel supply rate, and the speed of such change is comparatively quick, the cooling steam side is also controlled with a good response corresponding to the fuel supply rate. That is, according to this invention, the fuel supply rate to the gas turbine and the outlet steam temperature of the steam cooled system are employed as the control factors. The flow rate of the steam supplied into the steam cooled system is controlled appropriately so that the gas turbine high temperature portion may not be cooled or heated excessively and occurrence of thermal stresses at the high temperature portion may be suppressed. Hence, a device which can be operated safely and stably for a long time is realized and reliability of the plant can be remarkably enhanced.

Further, as described concretely based on embodiment 3, the outlet steam monitoring system according to the present invention is used in the steam cooled type gas turbine. The cooling steam is supplied into the high temperature portion of combustor, blade or the like, and the cooling steam, after being used for cooling, is recovered. There are provided the temperature detector for detecting the outlet temperature of the steam after being used for cooling and the control device which, having a detected signal input of the temperature detector for comparison with the predetermined temperature value, puts out a warning signal as well as a signal for throttling the opening of the fuel flow control valve to the predetermined opening or a signal for closing the shut-off valve, if a detected temperature of the temperature detector exceeds the predetermined temperature value. By employing such construction, upon the change in the outlet temperature of the steam after being used for the cooling, a disorder of the high temperature portion can be detected earlier and the control signal can be out put from the control device so that danger may be avoided.

What is claimed is:

1. An operating method of a steam cooled system in a combined cycle power plant comprising a combination of a gas turbine plant and a steam turbine plant, said combined cycle power plant including:

a gas turbine, said gas turbine including a turbine cylinder and a high temperature portion;

a steam turbine;

a waste heat recovery boiler for generating steam turbine driving steam using waste heat of said gas turbine;

a steam cooled system using steam for cooling said high temperature portion of said gas turbine; and a steam recovery system for recovering superheated steam coming from said steam cooled system into said steam turbine;

wherein said operating method comprises:

providing a high temperature control valve at a cooling steam outlet of said high temperature portion; and controlling said high temperature control valve so as to perform cooling steam temperature control so that the temperature of cooling steam coming out of said high temperature portion is set to a predetermined value and to perform cooling steam pressure control, which is preferential to cooling steam temperature control, so that pressure of the cooling steam coming out of said high temperature portion may not become lower than pressure in said turbine cylinder of said gas turbine.

2. A steam cooled system in a combined cycle power plant comprising a combination of a gas turbine plant and a steam turbine plant and including:

a gas turbine, said gas turbine including a turbine cylinder and a high temperature portion;

a steam turbine;

a waste heat recovery boiler for generating steam turbine driving steam using waste heat of said gas turbine;

a steam cooled system using steam for cooling said high temperature portion of said gas turbine; and a steam recovery system for recovering superheated steam coming from said steam cooled system into said steam turbine;

wherein a high temperature control valve is provided at a cooling steam outlet of said high temperature portion to perform cooling steam temperature control so that the temperature of cooling steam coming out of said high temperature portion is set to a predetermined value and to perform cooling steam pressure control, which is preferential to cooling steam temperature control, so that pressure of the cooling steam coming out of said high temperature portion may not become lower than pressure in said turbine cylinder of said gas turbine;

wherein a temperature detector is provided to detect the temperature of cooling steam coming out of said high temperature portion and providing a temperature detection signal; and wherein a control device which has the temperature detection signal input thereto, compares the temperature detection signal with a predetermined temperature value, and outputs a warning signal and at least one of a fuel flow control valve throttling signal for throttling an opening of the fuel flow control valve to a predetermined opening and a signal for closing a shut-off valve if the temperature detection signal corresponds to a temperature that exceeds the predetermined temperature value.

3. The system of claim 2, wherein said high temperature portion comprises a combustor of said gas turbine.

4. The system of claim 2, wherein said high temperature portion comprises a blade of said gas turbine.

5. An operating method of a steam cooled system in a combined cycle power plant comprising a combination of a gas turbine plant and a steam turbine plant, said combined cycle power plant including:

a gas turbine, said gas turbine including a turbine cylinder and a high temperature portion;

a steam turbine;

a waste heat recovery boiler for generating steam turbine driving steam using waste heat of said gas turbine;

a steam cooled system using steam for cooling said high temperature portion of said gas turbine; and a steam recovery system for recovering superheated steam coming from said steam cooled system into said steam turbine;

wherein said operating method comprises:

providing a high temperature control valve at a cooling steam outlet of said high temperature portion, a cooling steam temperature control system to control said temperature control valve so that the temperature of cooling steam at said cooling steam outlet of said high temperature portion is set to a predetermined value, and a cooling steam pressure control system to control said temperature control valve so that pressure of the cooling steam coming out of said high temperature portion may not become lower than pressure in said turbine cylinder of said gas turbine; and operating said temperature control valve by a lower value out of control signals of said temperature control system and said pressure control system.

6. A steam cooled system in a combined cycle power plant comprising a combination of a gas turbine plant and a steam turbine plant and including:

a gas turbine, said gas turbine including a turbine cylinder and a high temperature portion;

a steam turbine;

a waste heat recovery boiler for generating steam turbine driving steam using waste heat of said gas turbine;

a steam cooled system using steam for cooling said high temperature portion of said gas turbine; and a steam recovery system for recovering superheated steam coming from said steam cooled system into said steam turbine;

wherein a high temperature control valve is provided at a cooling steam outlet of said high temperature portion, a cooling steam temperature control system is provided to control said temperature control valve so that the temperature of cooling steam at said cooling steam outlet of said high temperature portion is set to a predetermined value, and a cooling steam pressure control system is provided to control said temperature control valve so that pressure of the cooling steam coming out of said high temperature portion may not become lower than pressure in said turbine cylinder of said gas turbine, said temperature control valve being operated by a lower value out of control signals of said temperature control system and said pressure control system;

wherein a temperature detector is provided to detect the temperature of cooling steam coming out of said high temperature portion and providing a temperature detection signal; and wherein a control device which has the temperature detection signal input thereto, compares the temperature detection signal with a predetermined temperature value, and outputs a warning signal and at least one of a fuel flow control valve throttling signal for throttling an opening of the fuel flow control valve to a predetermined opening and a signal for closing a shut-off valve if the temperature detection signal corresponds to a temperature that exceeds the predetermined temperature value.

7. The system of claim 6, wherein said high temperature portion comprises a combustor of said gas turbine.

8. The system of claim 6, wherein said high temperature portion comprises a blade of said gas turbine.

9. An operating method of a steam cooled system in a combined cycle power plant comprising a combination of a gas turbine plant and a steam turbine plant, said combined cycle power plant including:

a gas turbine, said gas turbine including a high temperature portion;

a steam turbine;

a waste heat recovery boiler for generating steam turbine driving steam using waste heat of said gas turbine;

a steam cooled system using steam for cooling said high temperature portion of said gas turbine; and a steam recovery system for recovering superheated steam coming from said steam cooled system into said steam turbine;

wherein said operating method comprises:
controlling a flow rate of cooling steam supplied into said steam cooled system based on an outlet steam temperature of said steam cooled system and a fuel supply rate to said gas turbine.

10. A steam cooled system in a combined cycle power plant comprising a combination of a gas turbine plant and a steam turbine plant and including:

a gas turbine, said gas turbine including a high temperature portion;

a steam turbine;

a waste heat recovery boiler for generating steam turbine driving steam using waste heat of said gas turbine;

a steam cooled system using steam for cooling said high temperature portion of said gas turbine; and a steam recovery system for recovering superheated steam coming from said steam cooled system into said steam turbine;

wherein a control device is provided to control a flow rate of cooling steam supplied into said steam cooled system based on an outlet steam temperature of said steam cooled system and a fuel supply rate to said gas turbine;

wherein a temperature detector is provided to detect the temperature of cooling steam coming out of said high temperature portion and providing a temperature detection signal; and wherein a control device which has the temperature detection signal input thereto, compares the temperature detection signal with a predetermined temperature value, and outputs a warning signal and one of a fuel flow control valve throttling signal for throttling an opening of the fuel flow control valve to a predetermined opening and a signal for closing a shut-off valve if the temperature detection signal corresponds to a temperature that exceeds the predetermined temperature value.

11. The system of claim 10, wherein said high temperature portion comprises a combustor of said gas turbine.

12. The system of claim 10, wherein said high temperature portion comprises a blade of said gas turbine.

* * * * *